United States Patent [19]

Basler et al.

[11] 3,860,406

[45] Jan. 14, 1975

[54] METHOD OF MANUFACTURING GLASS
[75] Inventors: Wayne G. Basler, Ile; Robert J. Thompson, Monroe, both of Mich.
[73] Assignee: Ford Motor Company, Dearborn, Mich.
[22] Filed: Feb. 24, 1970
[21] Appl. No.: 14,728

Related U.S. Application Data
[63] Continuation of Ser. No. 674,605, Oct. 11, 1967, abandoned.

[52] U.S. Cl..................... 65/91, 65/99 A, 65/182 R
[51] Int. Cl............................................. C03b 18/02
[58] Field of Search........... 65/99, 182, 91, 99, 182

[56] References Cited
UNITED STATES PATENTS
3,301,651  1/1967  Long...................................... 65/99
3,481,728  12/1969  Basler et al........................... 65/182
3,486,869  12/1969  Alonzo et al. ....................... 65/99 X
3,493,359  2/1970  Lawrenson............................ 65/182
3,531,274  9/1967  Dickinson et al................... 65/99 A Primary Examiner—S. Leon Bashore
Assistant Examiner—Kenneth M. Schor
Attorney, Agent, or Firm—Keith L. Zerschling; William E. Johnson

[57] ABSTRACT

A method of manufacturing glass wherein molten glass is supplied to a pool of molten glass formed on the surface of a molten metal bath. The bath is supported in a cavity defined by refractory material contained within a substantially enclosed chamber. A propellent force is applied to the pool of glass to push glass out of the pool in a direction downstream of the chamber. The glass flows out to equilibrium thickness. The glass is stretched to a thickness less than equilibrium thickness and then cooled to form a self-supporting ribbon of glass.

8 Claims, 8 Drawing Figures

PATENTED JAN 14 1975

WAYNE G. BASLER
ROBERT J. THOMPSON
INVENTORS

BY
ATTORNEYS

PATENTED JAN 14 1975 3,860,406

WAYNE G. BASLER
ROBERT J. THOMPSON
INVENTORS

BY John R. Faulkner
William E. Johnson
ATTORNEYS

METHOD OF MANUFACTURING GLASS

This application is a continuation of application Ser. No. 674,605 filed 10-11-67 and now abandoned.

BACKGROUND OF THE INVENTION

This invention relates to a process for the manufacture of flat glass by the so-called "float process." In the "float process," molten glass is poured on the surface of a molten bath contained in a chamber to obtain a glass ribbon having true parallelism of its opposite faces and a lustrous, firepolished finish.

Generally, in the "float process," the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten metal bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float chambers" of prior art constructions are operated by pouring molten glass upon the metal bath of the chamber in a continuous manner to supply glass to a pool of molten glass formed at the entrance end of the chamber. In proportion to the amount of glass delivered to the pool, molten glass flows out from the pool to form a ribbon of glass. The glass ribbon achieves an equilibrium thickness and advances into a zone of the chamber which is cooler than the initial or flow-out zone thereof so that the glass ribbon is cooled to a semi-rigid state.

In making thicknesses of glass other than an equilibrium thickness, the semi-rigid glass ribbon is first engaged by gripping surfaces and then heated to a plastic state. A longitudinal tension force, acting between the gripping surfaces and the exit end of the chamber, is then applied to the ribbon to elongate it and draw it down to a desired thickness below equilibrium thickness.

SUMMARY OF THE INVENTION

This invention is directed to a method of manufacturing flat glass by the "float process" and, more particularly, the invention is directed to a method of manufacturing flat glass by the "float process" wherein stressing of the glass ribbon as it moves out of a pool of liquid glass at the entrance end of a "float chamber" is substantially reduced.

In its preferred form, the method of this invention for utilization in the production of flat glass on a continuous basis consists basically of the following steps. Glass forming materials are melted in a glass melting furnace and a prescribed quantity of the molten glass is delivered continuously to the surface of a molten metal bath. The metal bath is confined in a cavity formed by a refractory material housed in a substantially enclosed chamber. The molten glass delivered to the bath supplies a pool of molten glass formed on the bath at the upstream entrance of the chamber. A propellent force is applied to the molten glass in the pool to push or propel a prescribed quantity of the glass out of the pool in a direction generally downstream of the chamber. The propelled glass flows out toward an equilibrium thickness on the metal bath to form a glass ribbon. The glass ribbon is then cooled to a temperature at which the glass forms a self-supporting ribbon. It is obvious to one skilled in the art that if equilibrium thickness glass is desired, the self-supporting ribbon may be removed from the chamber without further processing thereof.

In accordance with the more detailed aspects of the method of this invention, the glass, after flowing out to equilibrium thickness, is stretched to a thickness less than equilibrium. The stretching of the glass ribbon may be accomplished by first cooling the glass to a semi-rigid state and then retarding the movement of the ribbon in a downstream direction in the chamber after it has achieved equilibrium thickness. The glass is then reheated and a stretching force is applied thereto from a point spaced downstream of the position at which the glass is retarded. The stretching force stretches the plastic, glass ribbon in a direction generally downstream of the chamber whereby the glass ribbon is drawn down to a desired thickness.

An advantage of propelling the glass out of the molten pool of glass in the chamber is found in the fact that a wider ribbon of glass is produced in the chamber. Since a wider ribbon of glass is produced, for the same daily tonnage through-put of a particular chamber, the rate at which the glass ribbon is advanced through the chamber is reduced. The reduced advancement rate allows a greater opportunity for the glass both to flow out to its full equilibrium thickness and to flow out any defects therein.

Another advantage in propelling the glass from the molten pool thereof is that molten glass having a temperature higher than heretofore usable in such a chamber may be introduced into the chamber. In this regard, the lower advancement rate of the glass along the length of the chamber, as described above, means that the glass may be delivered to the chamber at a higher temperature because the glass ribbon will have a longer time to dissipate its heat between entering the chamber and reaching the point whereat it must be in a semi-rigid state so that the advancement thereof may be retarded prior to stretching.

Still another advantage of propelling the molten glass out of the entrance pool is that the ribbon has a higher degree of "stability" in that it travels the length of the chamber with a reduced tendency for moving from a normal path to a path toward the sidewalls of the chamber. Movement of the glass ribbon into a sidewall of the chamber causes problems in the operation of the chamber. These problems are eliminated, almost entirely, by having the more stable ribbon developed when the molten glass is propelled from the entrance pool.

A still further advantage in propelling the glass from the molten pool at the entrance end of the chamber is that when making thicknesses of glass other than an equilibrium thickness, the tractive effort applied to the ribbon to draw the same down may be reduced per square foot of manufactured glass and the distortions in such glass are substantially reduced.

DESCRIPTION OF THE PREFERRED EMBODIMENT

General Chamber Construction

Figure 1:
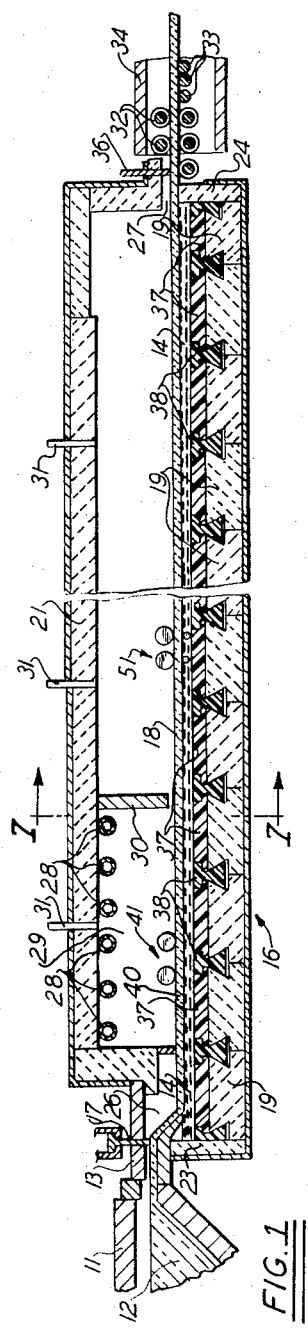
FIG. 1 is an elevational view, in cross section, showing a chamber in which the method of this invention for the manufacture of flat glass may be practiced.

In FIG. 1 there is seen the delivery end of a conventional glass melting furnace 11 in which a constant level of molten glass 12 is maintained. The molten glass is delivered through a forehearth 13 onto the surface of a molten metal bath 14 of tin or an alloy of tin contained within a chamber 16. A tweel 17 controls the rate at which the glass 12 flows from the furnace 11. The tin bath 14 has a density greater than that of the molten glass 12 so that the glass will float on the surface thereof. By delivering the glass at a constant rate to the bath, a continuous ribbon of glass 18 is produced.

The chamber 16 is defined by a lower refractory section, comprising a plurality of refractory blocks 19, an upper refractory section 21, refractory side sections 22 and refractory end walls 23 and 24. All of the refractory walls or sections are both formed from a plurality of refractory blocks and joined together except for an entrance 26 and an exit 27 to provide the substantially enclosed chamber 16. The refractory side sections 22 and the refractory end walls 23 and 24 project above the top surface of the lower refractory blocks 19 to define, in conjunction with the lower refractory section, the container or cavity for the bath of molten tin 14.

To maintain the tin in a molten condition and the glass ribbon 18 at the proper temperature required to form a ribbon of good optical quality, electrical heaters 28 (FIG. 1) are installed in the roof or upper refractory section 21 of the chamber 16 along the initial portion of the chamber which defines the flow-out zone 29 thereof. Coolers may also be provided in selected zones of the chamber 16 to assure that the glass ribbon 18 will be sufficiently cooled and hardened to be removed through the exit 27 without damage to the ribbon. The electrical heaters 28 are connected to a conventional power source (not shown) and may be individually controlled to provide the desired thermal gradient between the various zones of the chamber 16.

The flow-out zone 29 of the chamber 16 terminates at a radiation gate 30. The radiation gate extends downwardly from the upper refractory section 21 to a position spaced just above the ribbon 18. The purpose of the radiation gate is to concentrate the heat from heaters 28 in the flow-out zone of the chamber 16. The construction of the radiation gate will be described in detail later in the specification.

An atmosphere gas is introduced into the chamber 16 through gas inlets 31 in order to provide a protective atmosphere within the chamber above the molten tin 14 and the glass ribbon 18 floating thereupon. The atmosphere gas should be inert toward carbonaceous material and the tin making up the bath and actively reducing toward tin oxide. Also, the atmosphere gas should contain not more than traces of oxygen, carbon dioxide or water vapor when a carbonaceous liner is utilized in the chamber. As more fully described in U.S. Pat. No. 3,332,763, issued July 25, 1967, and assigned to the same assignee as this application, a protective atmosphere consisting essentially of, by volume, 4% carbon monoxide, 4% hydrogen and the remainder nitrogen is the preferred atmosphere when a carbonaceous liner is utilized.

The cooled glass ribbon is withdrawn from the chamber 16 by driven traction rollers 32 onto a conveyor 33 to enter an annealing lehr 34 where the ribbon is further cooled under controlled conditions to remove or reduce residual stresses therein. The exit 27 of the chamber 16 may be provided with a sealing member 36 both to retain the protective atmosphere gas in and to prevent the entrance of outside atmosphere into the chamber 16.

Figure 2:
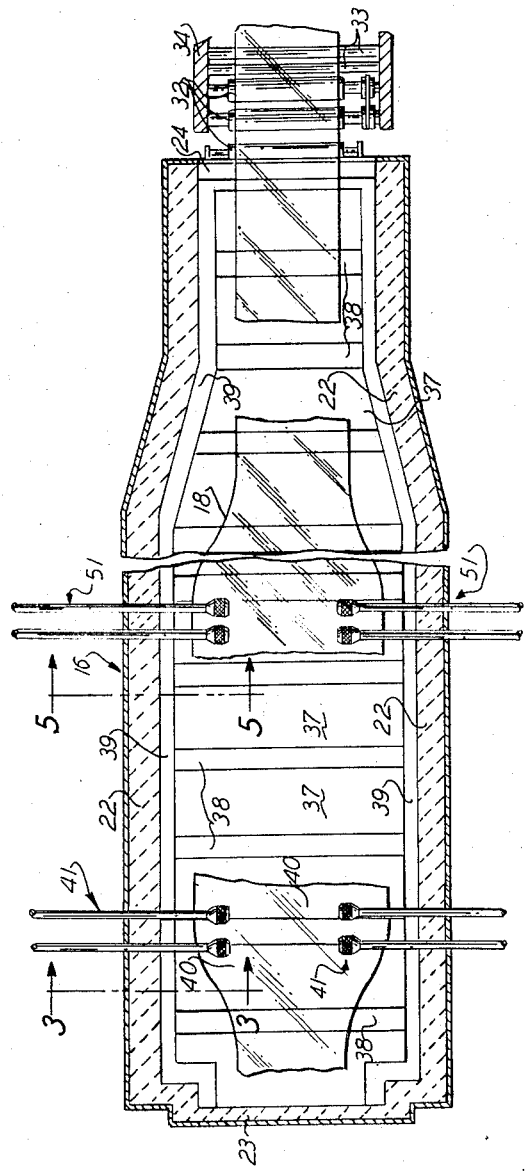
FIG. 2 is a plan view, in cross section, of the chamber of FIG. 1.

As described more fully in a co-pending patent application, Ser. No. 497,949, filed Oct. 19, 1965, and assigned to the same assignee as this application, now Pat. No. 3,393,061 a series of rectangular liner slabs 37, of solid carbonaceous material, such as graphite, are provided in the chamber 16. As best seen in FIG. 2, the slabs 37 are installed so as to cover or line, preferably, the entire bottom area of the tin bath 14 in the chamber 16. However, it should be appreciated that the slabs 37 are preferably coextensive with the individual refractory blocks 19 defining the lower refractory section. More particularly, the number of liner slabs 37 is both equal in number to and identical in size with the refractory ceramic blocks 19 necessary to define one transverse width of the lower refractory section so that if any upheaval in the lower refractory occurs during utilization of the chamber, the slabs 37 will adjust to the situation and there will be no buckling or cracking of a unitary piece of graphite.

With reference to FIGS. 1 and 2, each series of liner slabs 37 is held in position by a plurality of transversely extending keys 38. There is a plurality of keys 38 associated with each individual liner slab 37. The manner of utilizing the keys and slabs to line the chamber is described in detail in the above mentioned co-pending patent application Ser. No. 497,949.

Since the liner slabs 37 and the keys 38 are made from a carbonaceous material, such as the preferred graphite, which material is substantially less dense than tin, the slabs and keys are raised above the lower refractory section by a buoyant force exerted thereon by the molten tin. The slabs and keys do not rise to the top surface of the tin and float thereupon because of the manner in which the keys are supported in the lower refractory section. A depth of tin bath above the slabs 37 is maintained at a level of ½ to 4 inches in order to reduce the likelihood of the glass ribbon 18 coming in contact with the slabs if and when the glass buckles within the chamber 16.

Figure 3:
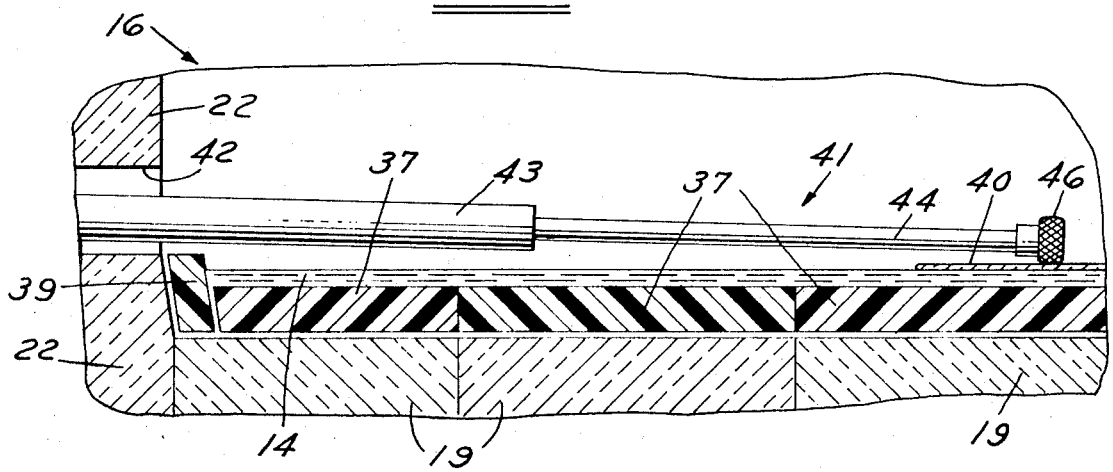
FIG. 3 is a partial, transverse view, taken along line 3—3 of FIG. 2, showing the top rolls utilized for applying a propellent force for pushing the molten glass out of the pool thereof at the entrance end of the chamber.
Figure 5:
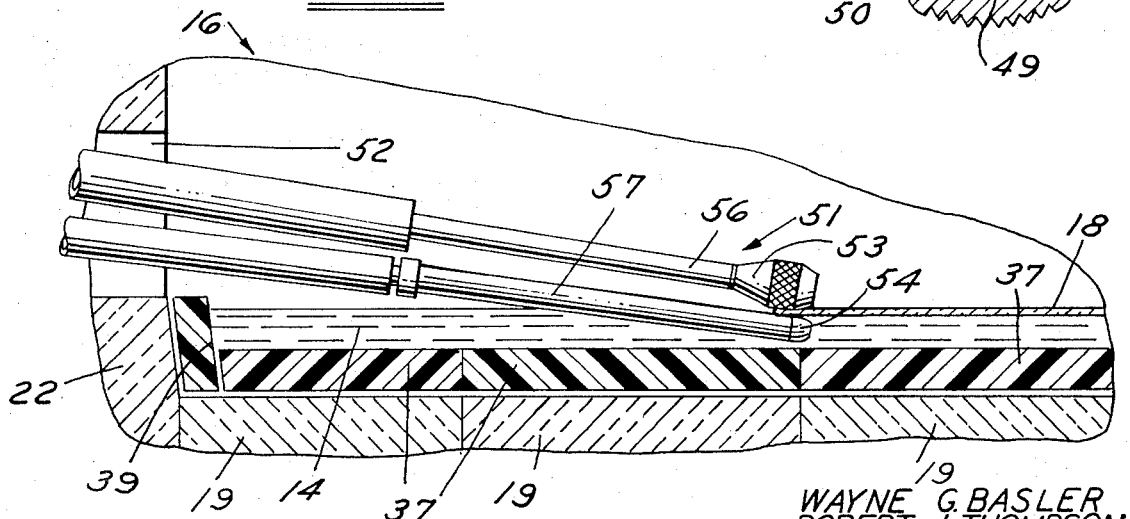
FIG. 5 is a partial, transverse view, taken along line 5—5 of FIG. 2, showing the edge rolls utilized to apply a retarding force to the glass ribbon prior to its stretching.
Figure 7:
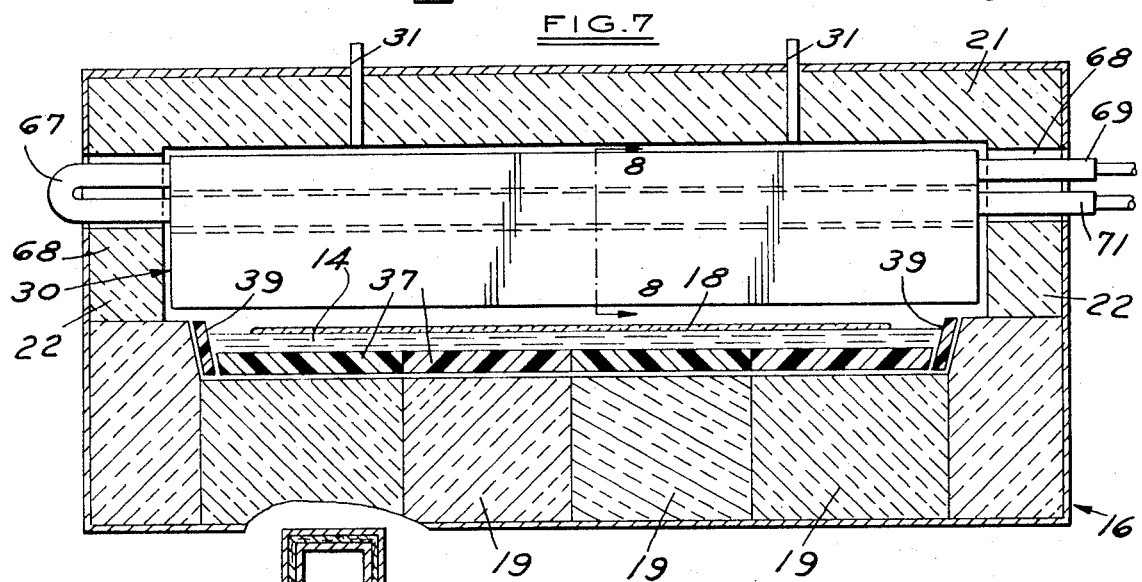
FIG. 7 is a transverse view, taken along line 7—7 of FIG. 1, showing a cross section of the chamber and a radiation gate employed therein.

As best seen in FIGS. 3, 5 and 7, the refractory side blocks 22 extend above the top surface of the lower refractory blocks 19. A sidewall liner 39, comprising one continuous, or in the alternative, several slabs of graphite, is mounted by suitable members (not shown) adjacent the refractory side blocks 22 for the entire length of each side of the chamber 16. The sidewall liner 39 is utilized to provide protection for the refractory side blocks 22 in the event that the glass ribbon 18 ruptures and a portion thereof moves toward the sidewall of the chamber 16.

The utilization of the carbonaceous liner blocks 37, the carbonaceous keys 38 and the carbonaceous sidewall liners 39 is not necessary in the performance of the method of this invention. However, these elements have been described in the preferred embodiment of this invention on the basis that the utilization of carbonaceous material in conjunction with the described protective atmosphere results in improved operation of the float chamber. The defect commonly known as "bloom" is substantially reduced in the production of float glass in such a lined chamber. The defect of "bloom" is caused by the discoloration of a layer of tin oxide adherent to a surface of the glass ribbon when the glass is heated to a temperature sufficient to allow bending of the glass. However, when both carbonaceous material and the specified protective atmosphere are employed in the chamber, the defect of "bloom" in float glass is substantially eliminated because of an interaction between the carbonaceous liner and the protective atmosphere which eliminates the tin oxide present in the tin bath.

Top Roll Construction

In accordance with the principles and teachings of the method of this invention, a pair of top rolls, generally designated by the numeral 41, are provided on each side of the chamber 16 to apply a propellent force to the molten glass to push the glass out of the molten pool 40 in the flow-out zone 29 of the chamber (FIG. 1). As best seen in FIG. 3, each pair of top rolls 41 (only one shown in the Figure) extend through an opening 42 in the side refractory section 22 of the chamber to engage the glass in the molten pool 40 to propel the same out of the pool and in a direction downstream of the entrance of the chamber. The portion of each of the top rolls 41 extending outside of the chamber is supported for rotational movement in a suitable supporting and rotating structure. The details of a supporting and rotating structure are conventional and do not form a part of this invention and are, therefore, not illustrated.

Each top roll 41 is formed of a rotatable support portion 43 secured to the supporting and rotating structure, a rotatable arm 44 secured to the rotatable support, and a knurled top roll 46 secured to the rotatable arm. The rotating and supporting structure rotates the knurled roll in such a direction that the peripheral surface of the knurled roll pushes or propels the glass out of the pool 40 in a direction toward the exit 27 of the chamber 16. Both the support portion 43 and the arm 44 of each top roll 41 have fluid passages therein such that cooling fluid may be conducted to and from the associated knurled roll 46.

Figure 4:
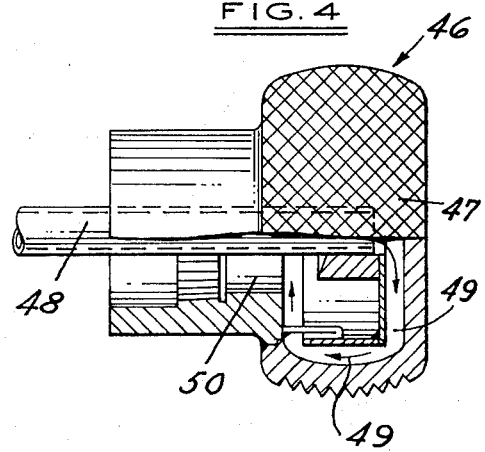
FIG. 4 is a view of a preferred construction of a top roll.

Construction of knurled top roll 46 is best understood by reference to FIG. 4. A knurl 47, formed as a plurality of pyramid-shaped projections, is machined into the peripheral surface of the roll 46. A fluid passageway 48, continuous with passageways (not shown) in the rotatable arm 44 and the rotatable support portion 43 of the top roll 41, has a cooling fluid, such as water, conducted therethrough into a cavity 49 of the top roll 46. The cooling fluid entering the cavity 49 flows past the interior of the peripheral knurled surface of top roll 46 and is then discharged through a fluid passageway 50.

The knurled top roll 46 is constructed of a material such as No. 302 stainless steel, and is cooled by the cooling fluid to increase the operational life thereof. Many other forms of a knurl may be utilized in constructing the roll 46 as the type of knurl employed is not critical.

In the preferred construction of the knurled rolls, each side of the chamber 16 has two rolls located in the pool 40 of molten glass. The operation and utilization of the top rolls for propelling the molten glass out of the pool thereof at the entrance end of the chamber will be described in detail in the "Operation" portion of this specification.

Edge Roll Construction

On each side of the chamber 16, downstream of the top roll 41, as viewed in FIG. 2, are located a pair of sets of edge rolls, generally designated by the numeral 51. The edge rolls are utilized to apply a retarding force to the glass and, in conjunction with the tractive effort applied by the driven traction rolls 32 in the lehr 34, provide a point from which the glass ribbon 18 may be drawn down to thicknesses other than an equilibrium thickness.

As best seen in FIG. 5, each set of edge rolls 51 (only one set shown in the Figure) extends through an opening 52 in the side refractory section 22. The set of edge rolls is formed by an upper knurled roll 53 and a lower roll 54 supported on support arms 56 and 57, respectively. The support arms 56 and 57 are, in turn, supported and rotatably driven by apparatus (not shown) such that the peripheral surfaces of the rolls 53 and 54, in contact with the edge of the glass ribbon 18, are moving in a direction downstream of the chamber 16. The rolls are driven at a uniform speed and act as retarding elements to retard movement of the glass toward the driven traction rolls 32 which apply a pulling force on the glass.

Figure 6:
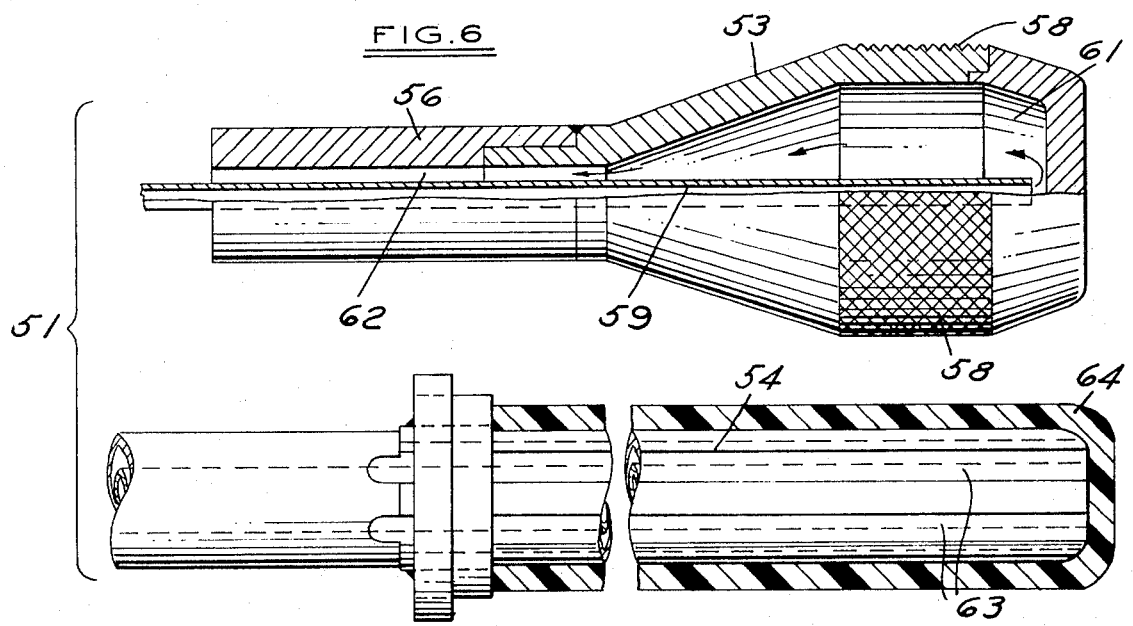
FIG. 6 is a view of a preferred construction of the edge rolls.

The construction of the knurled roll 53 and the lower roll 54 is best understood with reference to FIG. 6. The knurled roll 53 has a pyramidical, knurled surface area 58 thereon extending around the periphery thereof. Cooling fluid, such as water, is conducted through a passageway in the support arm 56 and through a fluid conduit 59 in the roll 53. The cooling fluid flows into a cavity 61 located below the outside surface area of the knurled roll 53 and is discharged through a conduit 62 in the support arm 56.

The lower roll 54 is constructed by machining grooves 63 into an otherwise plain roll. A sleeve 64 of graphite material is then fitted over the roll and secured thereto by suitable means. The graphite sleeve provides a protective medium about the roll when the roll is surrounded by the molten tin. The roll 54 may also be formed of No. 302 stainless steel.

The function and operation of the edge rolls will be described in detail in the "Operation" portion of this specification.

Radiation Gate Construction

As best seen in FIG. 1, the top rolls 41 and the edge rolls 51 are separated by a radiation gate 30 so that the flow-out zone 29 of the chamber 16 is isolated from the rest of the chamber. The construction of the radiation gate 30 is best understood by reference to FIGS. 7 and 8.

In a preferred construction of the radiation gate 30, a hair-pin cooler 67 extends across the entire width of the chamber 16. Opposite ends of the cooler 67 are received in openings 68 in the refractory side sections 22 and are supported thereby. Hoses 69 and 71 are connected to opposite ends of the cooler 67, which ends are in vertical, stacked arrangement, to provide inlet and return conduits for a coolant, such as water, thereby permitting a continuous recirculation of the coolant through the cooler.

Figure 8:
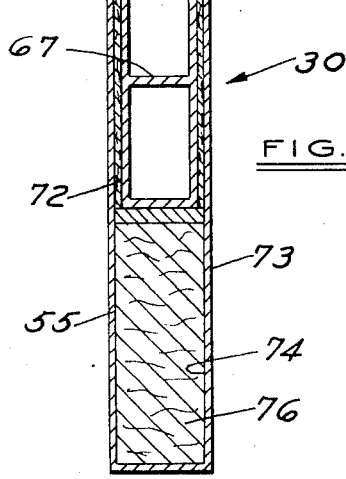
FIG. 8 is an elevational view, taken along line 8—8 of FIG. 7, showing a cross section of the radiation gate.

As best seen in FIG. 8, the cooler 67 is encompassed by a layer of insulating material 72, such as "FiberFax." A sheath 73, fabricated from sheet metal and formed into substantially a rectangular shape, has its upper part extending around the insulated cooler 67 and the lower part defining a pocket 74. The sheath 73 extends from the top of the chamber 16 downward to within approximately 1 to 4 inches of the ribbon of glass 18 floating on the molten bath 14. The pocket 74 of the lower part of the sheath 73 is filled with an insulating wool 76. The sheath 73 is preferably formed from stainless steel so that it acts as a heat reflecting surface and also so that it is not readily damaged by the relatively high temperature and protective atmosphere utilized in operation of the chamber 16.

The function and operation of the radiation gate 30 in conjunction with the top rolls 41 and the edge rolls 51 will be described in detail in the "Operation" portion of this specification.

Operation

During the description of the operation of the glass manufacturing chamber in accordance with the principles and teachings of the method of this invention, reference will be made primarily to FIGS. 1 and 2 of the drawings. The mechanical details of the top rolls 41, the edge rolls 51 and the radiation gate 30 will not be discussed in detail in this section.

Glass forming materials are melted in the glass melting furnace 11 so as to form the molten glass 12. The molten glass is moved through the forehearth 13 and by controlled operation of the tweel 17, a prescribed amount of glass is poured continuously through the entrance 26 of the chamber 16 onto the bath of molten tin 14. In accordance with the teachings of this invention, the glass poured out upon the bath has a temperature of approximately 2050° F. The poured glass joins the pool of glass 40 already floating upon the bath. As the added material joins the bath, the pool of glass widens out and the top rolls 41 are brought into engagement with the surface thereof.

The knurled top rolls 46 of the top rolls 41 engage the surface of the molten glass. The speed of rotation of the top rolls 41 is controlled such that the peripheral portion of the knurled rolls 46 moves at a prescribed speed to apply a propellent force to the surface of the molten glass which creates a prescribed velocity in the glass in a direction downstream of the chamber away from the entrance thereof. By controlling the amount of propellent force applied to the molten pool of glass, through control of the revolutions per minute of the roll 41, the same amount of molten glass added to the pool 40 from the glass melting furnace 11 is propelled out of the pool downstream of the chamber 16.

In a particular chamber utilized to manufacture glass by the "float process," which has a tin bath width of 260 inches, 300 tons of glass were manufactured per day. The glass had an entering temperature of 2,050° F. and the top rolls were rotated at a peripheral speed of 74 inches per minute to propel the glass out of the molten pool thereof in the entrance zone of the chamber. As the molten glass passed under the top rolls, the temperature thereof was in the range of 1,800° F. to 1,850° F., a temperature at which the glass is still in a molten condition.

The glass propelled out of the pool 40 of molten glass, by the engagement and movement of the surface of the liquid glass by the top rolls 41, proceeds downstream in the chamber 16 to pass under the radiation gate 30. The space between the radiation gate and the entrance 26 of the chamber 16 is the flow-out zone 29 of the chamber. The heaters 28 supply sufficient heat to this zone to insure that the glass ribbon stays in a liquid or molten condition in this zone. Thus, as the molten glass is propelled out of the pool, sufficient heat is concentrated in the flow-out zone of the chamber such that the glass spreads out upon the bath to an equilibrium thickness of approximately 0.280 inches.

Utilization of the top rolls 41 in conjunction with the pool of molten glass 40 causes the glass to be spread out on the bath to a uniform and stable width. As such, the ribbon may be propelled at a slower rate downstream in the chamber since the volume of processed glass remains a constant and the area over which the glass is spread is increased. By thus decreasing the advancement speed of the molten glass ribbon to obtain a particular tonnage of glass, the glass material has a greater length of time in the flow-out zone of the chamber to flow out any distortional or other defects in the ribbon.

Also, as previously mentioned, the glass poured into the chamber is at a temperature of approximately 2,050° F. This temperature is approximately 100° hotter than glass introduced into a float chamber wherein top rolls 41 are not utilized to propel the molten glass out of the entrance pool thereof. The increase in temperature of the glass is due to the fact that the chamber not utilizing top rolls must move the glass along the bath at a faster rate since, in such a chamber, the glass width decreases after flow out and before passing under the edge rolls. At the faster movement rates, if the glass is at the hotter entrance temperature, the glass cannot be cooled sufficiently by the time it passes out of the flow-out zone 29 of the chamber 16 so that the other steps in the "float process" can be carried out thereupon. However, by using the glass material at a hotter temperature, as is allowed when top rolls are utilized to propel the glass, the equilibrium thickness of the glass is obtained at a faster rate and a uniform width of distortion free ribbon is maintained from the top rolls to the edge rolls.

The radiation gate 30 separates and insulates the flow-out zone 29 from the remainder of the processing chamber 16. In the portion of the chamber beyond the radiation gate 30, the temperature initially drops off and then is subsequently increased for the purpose of first solidifying the glass ribbon to a semi-rigid state and thereafter reheating the same to a plastic state so the ribbon may be drawn down to a finished size. Thus, as the glass ribbon 18 passes under the radiation gate 30, the ambient temperature of the chamber 16 drops off to a degree to allow the liquid glass to turn initially to a plastic state and then to a semi-rigid state whereat it may be engaged by the edge rolls 51. As the glass passes under the radiation gate 30, the glass is in a plastic state and has a temperature in the general range of 1,600° F. to 1,650° F. However, by the time the glass reaches the edge rolls 51, it is in a semi-rigid state and has a temperature of approximately 1,400° F. At this temperature, the glass can be gripped by the two pairs of edge rolls 51 so that the rolls may apply a retarding force to the glass and the glass may be drawn down to a thickness less than the equilibrium thickness. It is of course obvious to one skilled in the art that if equilibrium thickness glass is desired from the chamber, the stretching of the glass to less than equilibrium thickness would not be undertaken. However, the method to be described herein contains the additional steps required for stretching the glass to a thickness less than equilibrium thickness.

In the specific chamber previously described, the edge rolls 51 are traveling at a rate of 74 inches per minute peripheral speed, which speed is equal to the peripheral rate of travel of the top rolls 41. By having the top rolls and the edge rolls apply a substantially equal force to the glass ribbon 18, the top rolls do not pull the molten glass out of the pool 40 of glass at the entrance end of the chamber whereby stressing of the glass coming from the pool is occasioned.

The edge rolls 51, in cooperation with the driven traction rolls 32 in the lehr 34, which traction rolls are driven at a substantially higher peripheral velocity than the edge rolls, provide the means for applying a pulling force to the glass ribbon 18 so as to stretch the same out and down from an equilibrium thickness to a thickness, for example, in the range of 0.130 to 0.120 inches. In this regard, intermediate the edge rolls 51 and the traction rolls 32 is a reheat area of the chamber 16 wherein sufficient heat is applied to the glass ribbon 18 to heat the to a temperature in the range of 1,600° F. to 1,650° F. at which the glass is plastic. When the glass ribbon is plastic, the tractive force applied thereto by the rollers 32 is controlled so as to elongate the ribbon from the point of gripping contact therewith by the top rolls 51 such that the ribbon 18 is necked down to a ribbon of required thickness. The degree of elongation and thus, the thickness of the final ribbon, is controlled by the exact temperature to which the ribbon is reheated and by the amount of tractive effort applied to the ribbon by the rolls 32 in accordance with the differential in peripheral speed between the rolls 32 and the rolls 51.

In accordance with the specific example given in this disclosure wherein a 260 inch bath chamber was utilized, the final ribbon developed in the lehr had a width of 108 inches when the top rolls 41 were utilized to propel the molten glass out of the flow-out zone of the chamber. This compared to a final ribbon width of only 95 inches when no top rolls were utilized in the same chamber and the glass ribbon was not propelled out of the flow-out zone of the chamber. In both cases, the daily tonnage production of the chamber was identical at 300 tons. Thus, it may be seen that propelling the glass out of the flow-out zone of the chamber also is advantageous in that it produces a wider ribbon, that it produces a ribbon having less distortion therein created by stressing, and that it allows the utilization of a glass having a higher initial temperature.

Also, by propelling the glass out of the flow-out zone of the chamber, the ribbon is extremely stable in that it progresses in a straight line down the length of the bath and does not have a tendency to move into engagement with the side refractory walls of the chamber.

Thus, there has been disclosed herein a method of manufacturing glass. The method of this invention will have many modifications which will be apparent to those skilled in the art in view of the teachings of this specification. It is intended that all modifications which fall within the true spirit and scope of this invention be included within the scope of the appended claims.

We claim:

1. A method for producing glass which comprises: melting glass forming materials in a glass melting furnace; delivering said molten glass to the surface of a molten metal bath contained in a cavity formed by refractory material housed in a substantially enclosed chamber thereby to supply a pool of molten glass formed on said metal bath at the upstream entrance end of said chamber; applying in said pool of glass a propellent force to said glass to push a prescribed quantity of molten glass out of said pool in a direction generally downstream of said chamber; flowing said propelled glass toward an equilibrium thickness; and cooling said glass to form a self-supporting ribbon of glass.

2. A method for producing glass on a continuous basis which comprises: melting glass forming materials in a glass melting furnace; continuously delivering prescribed quantities of said molten glass to the surface of a molten metal bath contained in a cavity formed by refractory material housed in a substantially enclosed chamber thereby to supply a pool of molten glass formed on said metal at the upstream entrance end of said chamber; applying in said pool of glass a propellant force to said glass to push a prescribed quantity of molten glass out of said pool and away from said entrance end of said chamber in a direction generally downstream of said chamber; flowing said glass toward an equilibrium thickness; stretching said glass to a thickness less than equilibrium thickness; and cooling said glass to form a self-supporting ribbon of glass.

3. A method for producing glass on a continuous basis which comprises; melting glass forming materials in a glass melting furnace; continuously delivering prescribed quantities of said molten glass to the surface of a molten metal bath contained in a cavity formed by refractory material housed in a substantially enclosed chamber thereby to supply a pool of molten glass formed on said metal at the upstream entrance end of said chamber; applying in said molten pool of glass a propellant force to said glass to push a prescribed quantity of molten glass out of said pool and away from said entrance end of said chamber in a direction generally downstream of said chamber; flowing said glass toward an equilibrium thickness; cooling said glass to a semi-rigid state; retarding advancement of said glass in the direction downstream of said chamber; heating said glass to a plastic state; applying a stretching force to said glass to reduce the glass thickness to less than equilibrium thickness; and cooling said glass to form a self-supporting ribbon of glass.

4. A method for producing glass on a continuous basis which comprises: melting glass forming materials in a glass melting furnace; continuously delivering said molten glass to the surface of a molten metal bath contained in a cavity formed by a refractory material housed in a substantially enclosed chamber thereby to supply a pool of molten glass formed on said metal bath at the upstream entrance end of said chamber; continuously propelling a prescribed quantity of molten glass out of said pool and away from said entrance end of said chamber by applying in said pool of glass a continuous propellant force in a direction generally downstream of said chammber; flowing said propelled glass toward an equilibrium thickness; cooling said glass after it substantially achieves said equilibrium thickness to a temperature at which said glass is in a semi-rigid state; gripping said glass with continuously moving gripping surfaces; heating said glass to a plastic state; applying a stretching force to said glass from a position spaced downstream of the position at which said glass is engaged by said gripping surfaces whereby said glass is elongated and the thickness thereof reduced to less than equilibrium thickness and; solidifying said stretched glass.

5. A method for producing glass on a continuous basis which comprises: melting glass forming materials in a glass melting furnace; continuously delivering said molten glass to the surface of a molten tin bath contained in a cavity formed by refractory material housed in a substantially enclosed chamber thereby to supply a pool of molten glass formed on said tin bath at the upstream entrance end of said chamber; providing a liner of carbonaceous material over at least a portion of the bottom of said cavity defined by said refractory material; supplying a protective atmosphere to said substantially enclosed chamber, which atmosphere is not reactive toward said tin bath and said carbonaceous material but is actively reducing to tin oxide, said carbonaceous liner reacting with oxygenous impurities in said atmosphere and in said molten tin bath to rid said chamber of said impurities; continuously propelling a prescribed quantity of molten glass out of said pool and away from said entrance end of said chamber by applying in said pool of glass a continuous propellant force in a direction generally downstream of said chamber; flowing said propelled glass toward an equilibrium thickness; cooling said glass after it substantially achieves said equilibrium thickness to a temperature at which said glass is in a semi-rigid state; gripping said glass with continuously moving gripping surfaces; heating said glass to a temperature at which said glass is in a plastic state; continuously applying a stretching force to said glass in a downstream direction from the position at which said glass is engaged by said gripping surfaces whereby said glass is elongated and the thickness thereof reduced to that desired and; solidifying said stretched glass.

6. The method of producing glass on a continuous basis as defined in claim 3 wherein said step of propelling glass out of said pool is accomplished by bringing rotating members into engagement with the top surface of said pool of glass and rotating the members so that the peripheral surfaces thereof are moving in a direction downstream of said chamber when in contact with said glass.

7. A method for producing a glass ribbon on a continuous basis, the ribbon having an increased width dimension and a reduced tendency to deviate from a straight path of movement through a chamber in which the glass ribbon is manufactured, which method comprises the steps of: melting glass forming material in a glass melting furnace at a temperature in excess of 2,050°F; continuously delivering prescribed quantities of said molten glass at a temperature of approximately 2,050°F to the surface of a molten metal bath contained in a cavity formed by refractory material in the substantially enclosed chamber thereby to supply a pool of molten glass formed on said metal bath at the upstream entrance end of said chamber; continuously propelling a prescribed quantity of molten glass out of said pool and away from said entrance end of said chamber by applying in said pool of glass a continuous propellant force in a direction generally downstream of said chamber; flowing said propelled glass toward an equilibrium thickness; and thereafter cooling said glass to form a self-supporting ribbon of glass.

8. A method for producing a glass ribbon on a continuous basis, the ribbon having an increased width dimension and a reduced tendency to deviate from a straight path of movement through a chamber in which the glass ribbon is manufactured, which method comprises the steps of: melting glass forming material in a glass melting furnace at a temperature in excess of 2,050°F; continuously delivering prescribed quantities of said molten glass at a temperature of approximately 2,050°F to the surface of a molten metal bath contained in a cavity formed by refractory material in the substantially enclosed chamber thereby to supply a pool of molten glass formed on said metal bath at the upstream entrance end of said chamber; continuously propelling a prescribed quantity of molten glass out of said pool and away from said entrance end of said chamber by applying a continuous propellant force to said pool of glass in a direction generally downstream of said chamber; flowing said propelled glass toward an equilibrium thickness; thereafter cooling said glass to a temperature at which said glass is in a semi-rigid state; gripping said glass with continuously moving gripping surfaces; heating said glass to a plastic state; continuously applying a stretching force to said glass from a position spaced downstream of the position at which said glass is engaged by said gripping surfaces whereby said glass is elongated and the thickneess thereof reduced to that desired and; solidifying said stretched glass.

* * * * *